FIG-4

CHARLES S. W. KING
WILLIAM J. STOLP
OLIVER R. ROWE
INVENTORS.

BY
Parratt & Richards

June 13, 1950  O. R. ROWE ET AL  2,511,738
CAN SEAMING MECHANISM
Filed June 29, 1948  6 Sheets-Sheet 5

CHARLES S.W. KING
WILLIAM J. STOLP
OLIVER R. ROWE
INVENTORS.

BY
Parratt & Richards

CHARLES S. W. KING.
WILLIAM J. STOLP
OLIVER R. ROWE
INVENTORS.

Patented June 13, 1950

2,511,738

UNITED STATES PATENT OFFICE 2,511,738

CAN SEAMING MECHANISM

Oliver R. Rowe, Charles S. W. King, and William J. Stolp, Charlotte, N. C., assignors, by direct and mesne assignments, of one-half to R. H. Bouligny, Inc., a corporation of North Carolina, and one-half to Dixie Canner Company, Athens, Ga., a corporation of Georgia Application June 29, 1948, Serial No. 35,918

9 Claims. (Cl. 113—23)

1

This invention relates to can seaming mechanisms. and in particular to mechanisms of this sort primarily adapted for home canning operations.

A principal feature of the can seaming mechanism of the present invention is a unique arrangement for applying the seaming rolls by which the force of application is balanced with respect to the chuck means provided for supporting a can body and lid for seaming. Another important feature is an arrangement by which the application of the seaming rolls may be finely adjusted.

These and other features of the present invention are described in detail below in connection with the accompanying drawing, in which.

Briefly described, the can seaming mechanism of the present invention comprises essentially a frame structure 10 adapted for supporting a can body 11 and an associated lid 12 for seaming, a crosshead or roller bar 13 mounted on the frame structure 10 for reciprocation transversely of the can body 11 and lid 12 to be seamed, seaming rolls 14 and 15 carried on the crosshead 13, and means which will be described in detail presently for reciprocating the crosshead 13 to apply the seaming rolls 14 and 15 successively for seaming the lid 12 on the can body 11.

Figure 1:
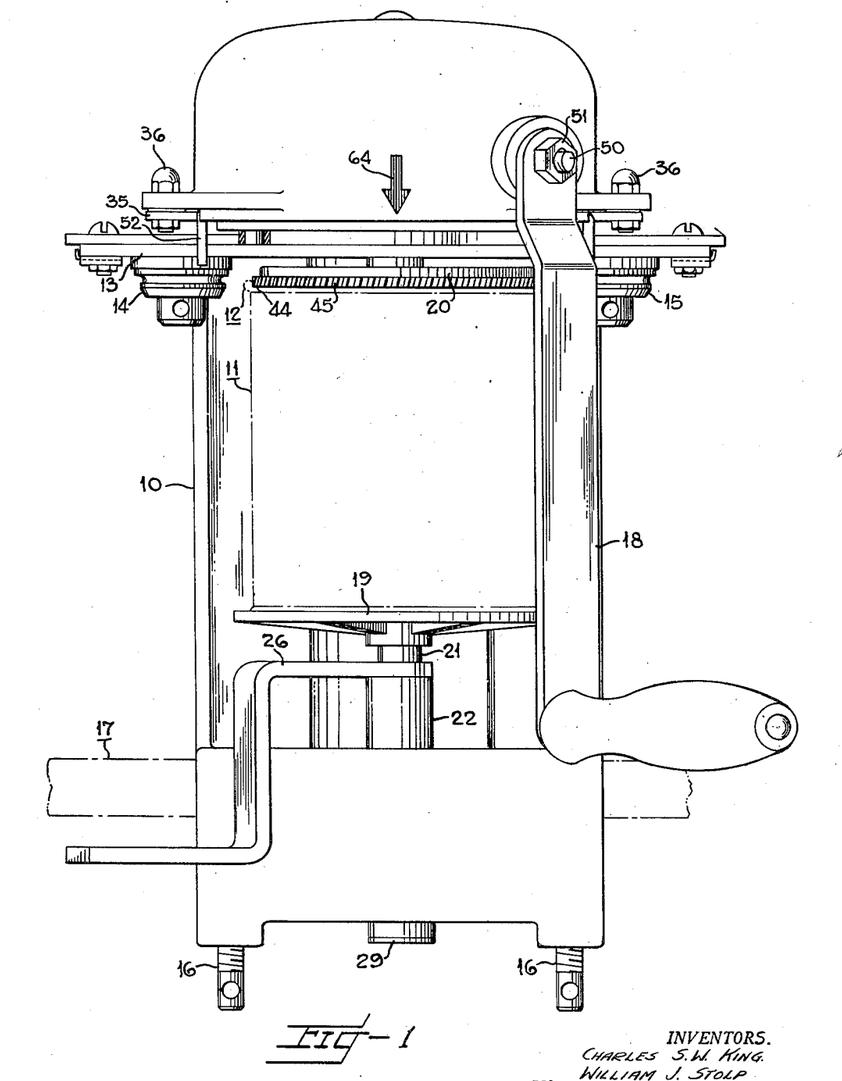
Fig. 1 is a front elevation of a can seaming mechanism embodying the present invention.
Figure 3:
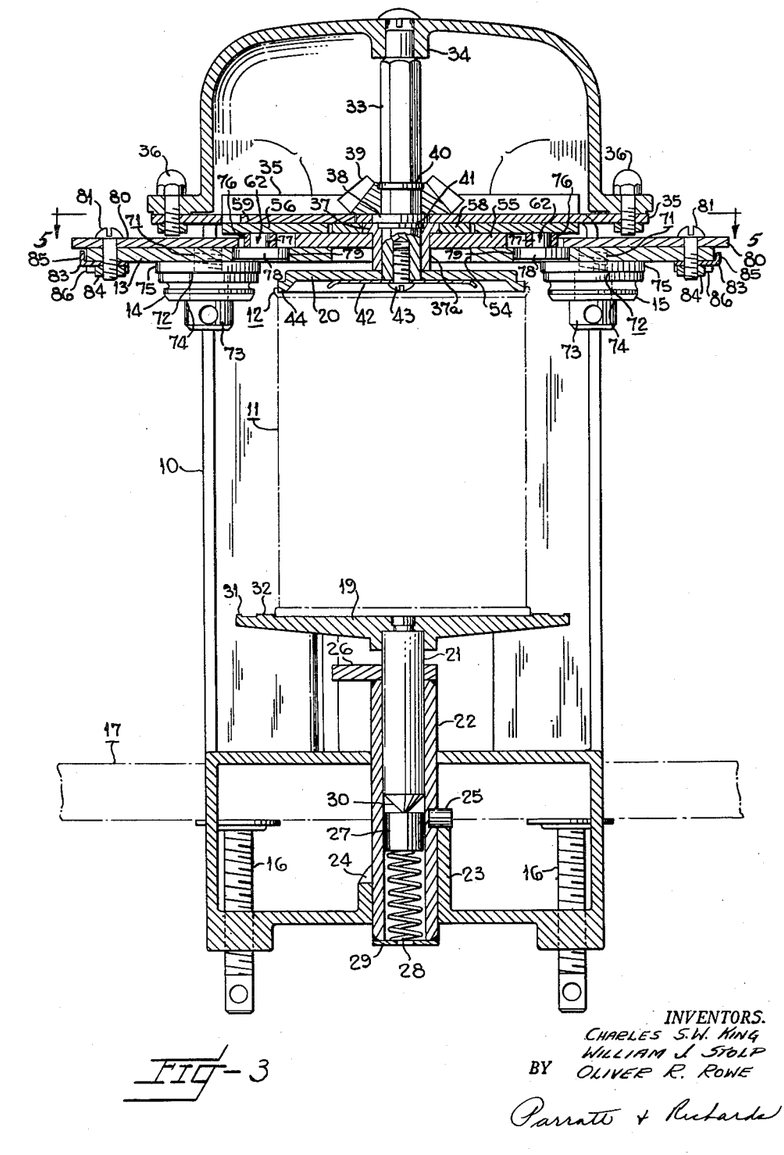
Fig. 3 is a vertical section taken substantially on the line 3—3 in Fig. 2.
Figure 4:
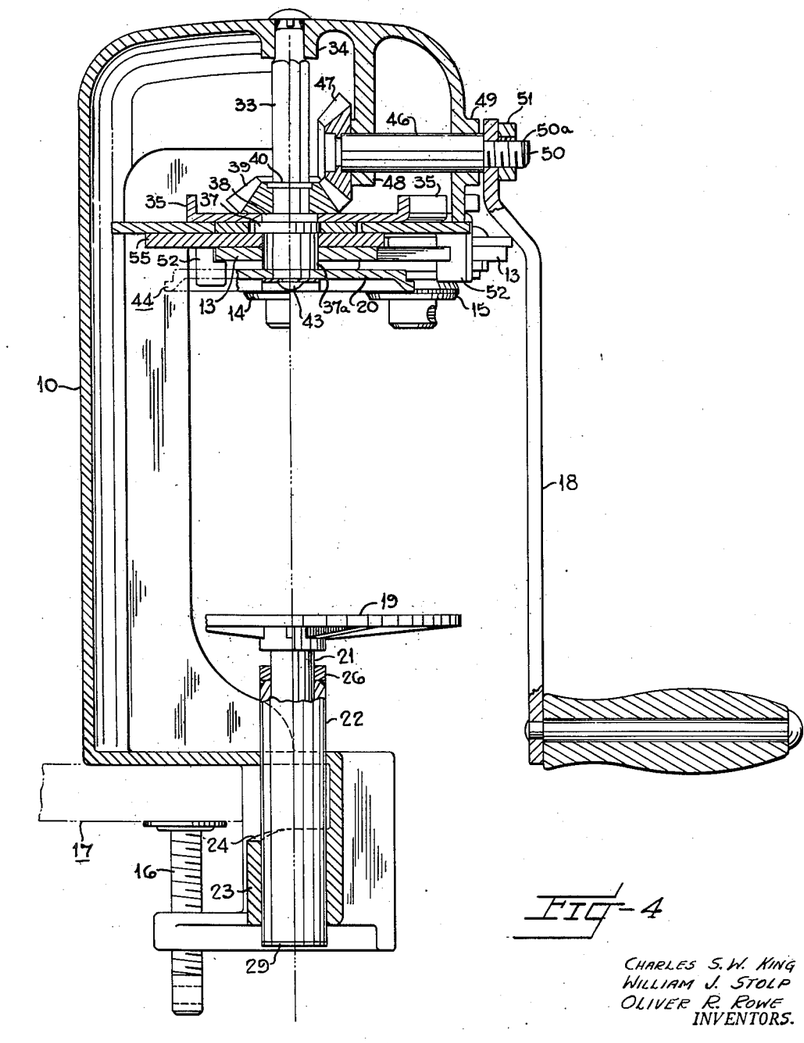
Fig. 4 is a vertical section arranged with angularly related quarters as indicated by the line 4—4 in Fig. 2.

The frame structure 10 is fitted at its lower portion with screw clamps 16 for mounting on the edge of a table or the like as indicated by the broken lines at 17 (compare Figs. 1, 3, and 4). The head portion of the frame structure 10 carries a suitable hand crank 18 by which the seaming mechanism is operated.

The can body 11 and associated lid 12 are supported on the frame structure by chuck means

2 comprising a rotatable supporting table 19 and a driving chuck 20. The supporting table 19 is carried on a spindle 21 (as shown best in Fig. 3), which is received in a tubular sleeve 22, and which sleeve 22 is in turn received in a flanged aperture 23 at the lower portion of the frame structure 10.

The flanged aperture 23 is formed with an upper extending edge providing a cam face as at 24, and the tubular sleeve 22 is fitted with a lug 25 for following the cam face 24 so that upon rotation of the tubular sleeve 22 it is axially displaced in the flanged aperture 23. Means for rotating the tubular sleeve 22 is provided by a lever arm 26 fixed on the upper end of the sleeve 22 (compare Figs. 1 and 3), and by manipulating this lever arm 26 the supporting table 19 may be elevated for clamping a can body 11 and an associated lid 12 against the driving chuck 20, or lowered for inserting or removing a can body and lid, as desired. The spindle 21 carrying the supporting table 19 is axially supported in the tubular sleeve 22 by resilient means comprising a plug member 27 and spring 28 contained in the sleeve 22 by a retaining plate 29 fixed on its bottom end, so that the can body 11 and lid 12 are always clamped against the driving chuck 20 under a uniform pressure.

The lower end of the spindle 21 is tapered as at 30 to dispose the area of contact with the plug member 27 at the center thereof and thereby reduce the moment of friction forces at this point to a minimum. If desired, interchangeable plug members 27 of varying height may be provided to adjust the supporting table 19 vertically for use with different size can bodies 11, such as the face of the table 19 may be adapted to support by suitable concentric bosses as shown at 31 and 32 in Fig. 3.

The driving chuck 20 is carried on a drive shaft 33 which is journalled on the head portion of frame structure 10 in the bore of a boss 34, and in a support plate 35 assembled on the head portion of frame structure 10 by bolts 36. The major portion of the drive shaft 33 is hexagonal in cross-section and the driving chuck 20, an eccentric member 37, a circular bushing 38, and a bevel gear 39, are formed with bores of corresponding cross-section and thus fitted for rotation with the shaft 33.

The bevel gear 39 is arranged on the drive shaft 33 just above the support plate 35, and the circular bushing 38 is disposed under the bevel gear 39 to ride in a suitable bearing aperture in the support plate 35. The bevel gear 39 and circular bushing 38 are positioned on the drive shaft 33 between retaining rings 40 and 41 which are placed in grooves (not shown) in shaft 33. The eccentric member 37, which has a cylindrical shank 37a, is fitted over the portion of the drive shaft 33 extending below the support plate 35, and the driving chuck 20 is positioned against the lower end of the cylindrical shank 37a and secured on the extending end of shaft 33 by a spring plate 42 bearing on the lower face of the chuck 20 and fastened to shaft 33 by a screw 43.

The driving chuck 20 is formed with a peripheral flange portion as at 44 disposed downwardly to fit inside the lid 12 and support it during the seaming operation, and the outer face of this peripheral flange 44 is preferably knurled as at 45 (see Figs. 1, 7, 8) to prevent the lid 12 from slipping during seaming. For different size cans, interchangeable driving chucks 20 may be used, in which case the driving chuck 20 may be changed by simply removing the screw 43 and spring plate 42 and replacing them when the new chuck has been set in position.

The drive shaft 33 is operated from the hand crank 18 through a crankshaft 46 which carries a bevel gear 47 disposed to engage the bevel gear 39 on drive shaft 33. The crankshaft 46 is journalled at 48 and 49 in the head portion of frame structure 10, and has an extending portion 50 which is formed with a flat as at 50a for engaging the hand crank 18, and which is threaded to receive a nut 51 for assembling the hand crank 18 in place. Accordingly, rotation of the hand crank 18 will result in rotation of the driving chuck 20 and consequent rotation of a can body 11 and lid 12 held between the support chuck 19 and driving chuck 20.

As previously mentioned, seaming rolls 14 and 15 are carried on a crosshead 13 which is arranged for reciprocation on the frame structure 10 transversely of the can body 11 and lid 12 to be seamed. The crosshead 13 is supported for operation in this manner by downwardly extending ears 52 formed at each end of the support plate 35 (compare Figs. 1 and 4), the crosshead 13 being formed with notches 53 (see Figs. 5 and 6) to allow it to be assembled for support by these ears 52 and having an elongated central slot 54 providing clearance for the cylindrical shank 37a of eccentric member 37 carried on drive shaft 33.

For reciprocating the crosshead 13, there is sandwiched between the crosshead 13 and the support plate 35 a cam member 55 arranged for rotation on the cylindrical shank 37a of eccentric member 37, and carrying in fixed relation a circular plate member 56 formed to provide an internal gear 57 surrounding the eccentric member 37 in spaced relation. Inside the internal gear 57, an external gear of lesser diameter 58 is mounted for displacement by the eccentric member 37 in engagement with the internal gear 57.

The eccentric member 37, external gear 58, and internal gear 57, comprise a speed reduction means between the drive shaft 33 and cam member 55, by which the cam member 55 is rotated at a rate slow enough to apply the seaming rolls 14 and 15 each for an effective period as the can body 11 and lid 12 are rotated during the seaming operation. The arrangement presently illustrated is adapted for a speed reduction of 21:1 by an internal gear 57 formed with twenty-one teeth and an external gear 58 formed with one less, or twenty teeth. If a different speed reduction were desired the gears 57 and 58 would be proportioned accordingly in the same manner.

As mentioned above, the external gear 58 is mounted for displacement on the eccentric member 37 in engagement with the internal gear 57. The external gear 58 is further arranged with an extending arm member 59 fixed on its upper surface and received in a flared slot 60 formed in the support plate 35 (see Figs. 2, 5, and 6). The extending end of this arm member 59 is enlarged somewhat as shown at 61 so that it is engaged by the slot 60 to prevent rotation of the external gear 58, but the slot 60 is long enough and is flared sufficiently to clear the arm member 59 so that it may slide and rock to allow displacement of the external gear 58 by the eccentric member 37 in engagement with the internal gear 57.

As a result, the external gear 58 is displaced in a circular path in engagement with the internal gear 57, which causes the internal gear 57 to rotate, and as there is a differential of 21:20 in teeth between the internal gear 57 and external gear 58, there is a progressive selection of engaging teeth which transmit one twenty-first of a revolution to the internal gear 57 for each circular displacement of the external gear 58 corresponding to one revolution of the eccentric member 37 and drive shaft 33. This rate of rotation is transmitted from the internal gear 57 to the cam member 55 to which it is fixed.

Figure 2:
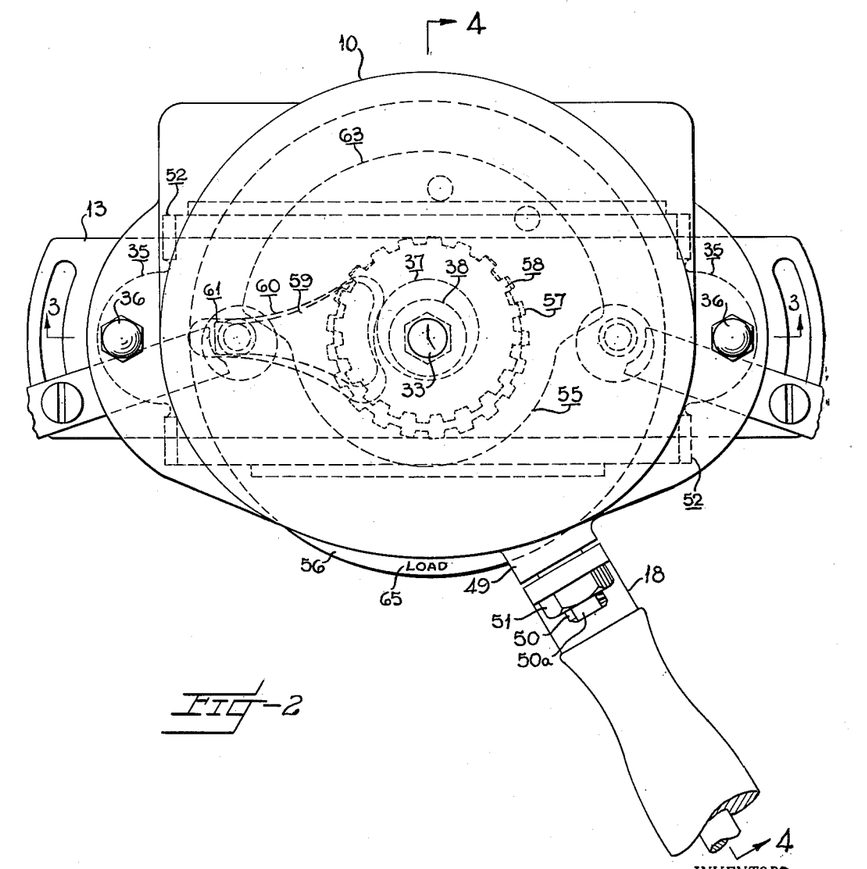
Fig. 2 is a plan view of the can seaming mechanism shown in Fig. 1.

Reciprocation of the crosshead 13 is actuated from the cam member 55 through opposed cam followers 62 mounted on the crosshead 13 in relation to the cam member 55. The cam member 55 is formed with a working face as at 63 which is disposed for contacting the opposed cam followers 62 alternately, and which has an extent sufficiently less than 180° to provide a neutral position (as illustrated in Fig. 2) at which both of the seaming rolls 14 and 15 are retracted so that a can body 11 and an associated lid 12 can be inserted for seaming, or removed after seaming. In order to indicate the position of the cam 55, a suitable index marking 64 may be located on the head portion of the frame structure 10 (as shown in Fig. 1) as a reference point in relation to markings on the circular plate member 56 as at 65 to indicate the neutral position of the cam member 55 (see Fig. 2), and at 66 and 67 to indicate the point of application of the seaming rolls 14 and 15 (compare Figs. 5 and 6).

A seaming operation is started with the cam member 55 in neutral position, so that both of the seaming rolls 14 and 15 are retracted, or spaced from the driving chuck 20, as noted above and as illustrated in Figs. 1, 2 and 3, to allow a can body 11 and an associated lid 12 to be loaded for seaming. After loading the can body 11 and lid 12 and clamping them against the driving chuck 20 by elevating the supporting table 19 as previously described, the seaming operation proper is carried out simply by turning the hand crank 18, which results in rotation of the driving chuck 20 and reciprocation of the crosshead 13 to apply the seaming rolls 14 and 15 as also described above.

Figure 5:
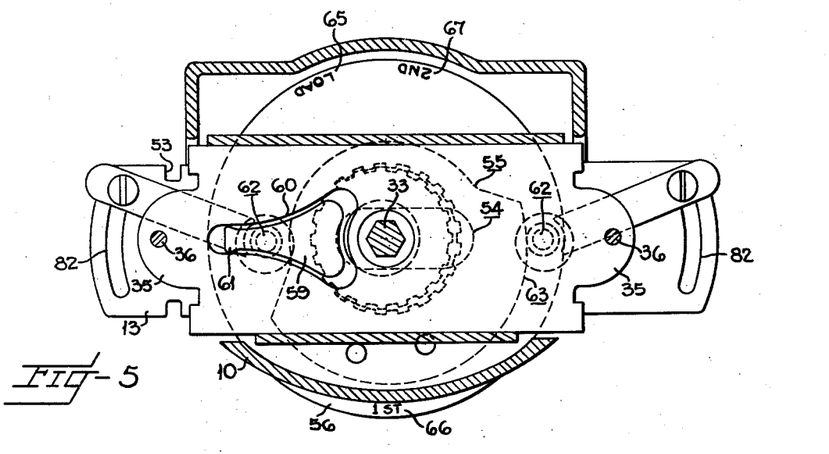
Fig. 5 is a horizontal section taken substantially on the line 5—5 in Fig. 3.
Figure 7:
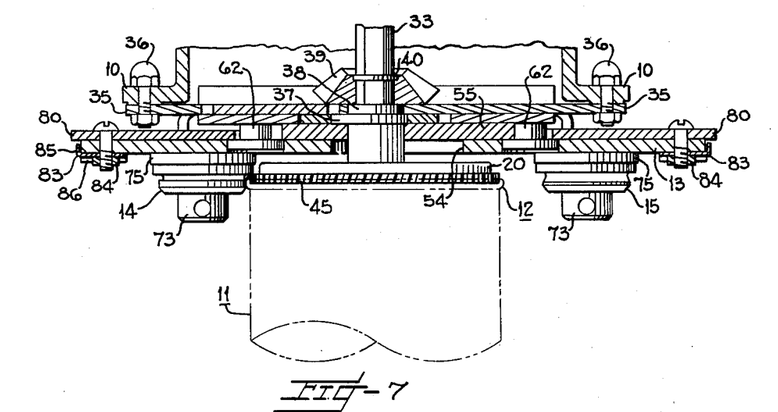
Figs. 7 and 8 are sectional details illustrating the manner in which the seaming rolls are applied for seaming.

A unique feature of this operating arrangement is the manner in which the force of application is transmitted to each of the seaming rolls 14 and 15 from the cam member 55 through a cam follower at the opposite end of the crosshead 13. Figs. 5 and 7, for example, illustrate the disposition of these operating elements when the first, or what is commonly designated as the "primary," seaming roll 14 is applied. As shown in Figs. 5 and 7, application of the seaming roll 14 is effected by reciprocation of the crosshead 13 to the right as seen in the drawing, which results from contact of the working face 63 of cam member 55 with the cam follower 62 at the righthand end of crosshead 13.

Accordingly, it will be seen that the force of application is transmitted to the seaming roll 14 from the drive shaft 33 through cam member 55 to the righthand cam follower 62 and then back through crosshead 13. As a result, the force of application is balanced with respect to the drive shaft 33. That is, the force on driving chuck 20 when seaming roll 14 is applied is necessarily equal to the force on cam member 55 when it is in contact with the righthand cam follower 62 to apply the seaming roll 14, and as these forces are applied in opposite directions and the driving chuck 20 and cam member 55 are both carried on the drive shaft 33, they balance or counteract each other so that there is no unbalanced lateral pressure on the drive shaft 33 during the seaming operation. Moreover, the seaming rolls 14 and 15 and the cam followers 62 are both mounted on the crosshead 13 according to the present invention, so that they are disposed in substantially the same horizontal plane, so that the flexure stresses on drive shaft 33 or other operating elements are negligible.

Figure 6:
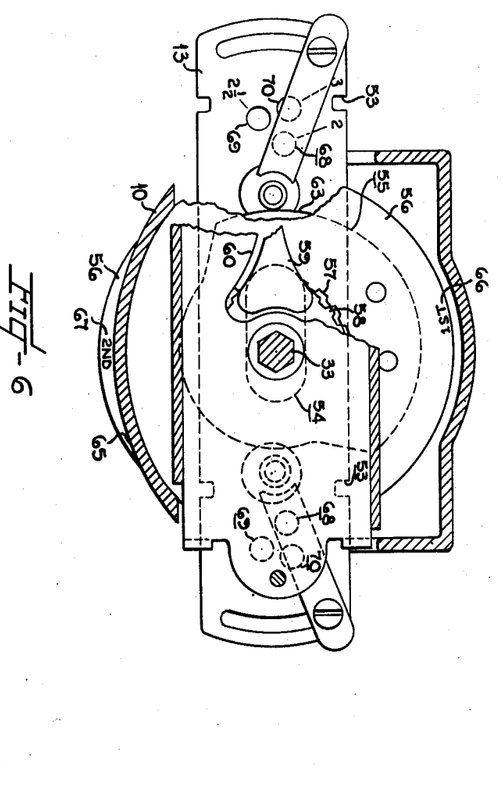
Fig. 6 is a corresponding horizontal section partly cut away and with the cam actuating the seaming rolls rotated 180°.
Figure 8:
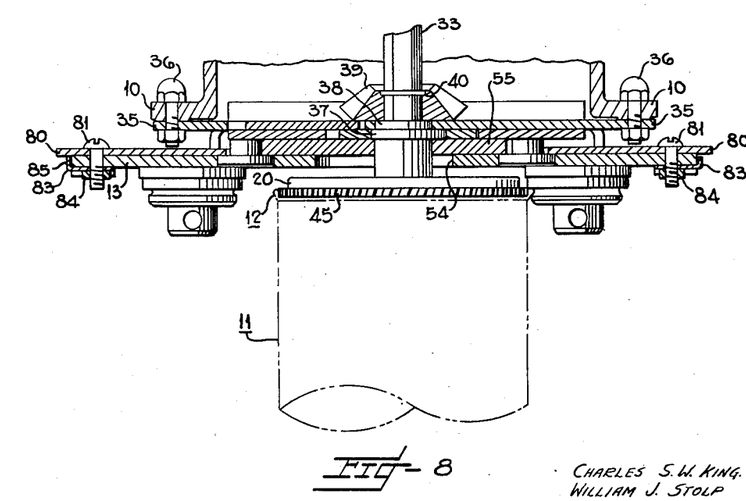

The second, or "secondary," seaming roll 15 is applied in exactly the same manner as described above when the cam member 55 rotates to the point where its working face 63 is in contact with the cam follower 62 at the left end of the crosshead 13 as illustrated in Figs. 6 and 8. As is well known in the art, this secondary seaming roll 15 can be formed to finish a seam between the lid 12 and can body 11 which has been curled by the primary seaming roll 14. After the secondary seaming roll 15 has been applied, a cycle of the cam member 55 will have been completed so that the neutral position will be reached again with both seaming rolls 14 and 15 retracted so that the can body 11 and lid 12 just seamed may be removed and another inserted for a subsequent operation.

It has previously been mentioned that the supporting table 19 may be adapted for various size cans, and that interchangeable driving chucks 20 may be provided for use with different can sizes, as desired. The seaming rolls 14 and 15 are likewise arranged on the crosshead 13 for disposition to accommodate a variety of can sizes. For this purpose, the crosshead 13 is formed with a plurality of tapped mounting apertures as at 68, 69, and 70 each located in accordance with a given can size which may be designated by an appropriate legend marked on the crosshead 13 as shown in Fig. 6. The seaming rolls 14 and 15 are mounted on studs 71 which may be screwed in the corresponding apertures of the group 68, 69, 70, for the can size selected (see Fig. 3). These studs 71 are shouldered about midway of their length as at 72, and their head portions 73 form a second shoulder as indicated at 74. A washer 75 is provided to fit each stud 71 about the shoulder 72, so that this washer 75 will be clamped between the crosshead 13 and the shoulder 72 to provide a bearing surface for the top face of the seaming rolls 14 and 15 when the studs 71 are inserted in the selected mounting apertures 68, 69, or 70. The studs 71 are further formed with the shoulder 72 spaced from the shoulder 74, presented by the head portion 73, sufficiently to allow free rotation of the seaming rolls 14 and 15 on the studs 71 between the head portions 73 and the washers 75.

To adjust the seaming rolls 14 and 15 more finely for a given can size, further means are provided according to the present invention by an eccentric mounting of the cam followers 62. The cam followers 62 comprise a roller 76 which is provided to ride the cam member 55, and which is carried for rotation on a pin 77 (see Fig. 3). The pin 77 projects from an enlarged base 78 and is arranged eccentrically with respect to this base 78 so as to mount the roller 76 on the crosshead 13 eccentrically with respect to its axis of rotation (compare Figs. 2, 5, and 6). The base 78 forming the eccentric mounting for the roller 76 is fitted in an aperture as at 79 in the crosshead 13 and has fixed on its upper surface a lever member or arm 80 overlying the top surface of the crosshead 13 and suitably extending slightly beyond the ends of the crosshead 13. By this arrangement, it will be seen that the base 78 may be rotated in the crosshead 13 by adjusting the position of the lever arm 80 to shift the position of the eccentrically disposed pin 77 and thereby adjust or set the rollers 76 in relation to the cam member 55 which in turn will adjust the application of the seaming rolls 14 or 15. It is common practice to guage the adjustment of the seaming rolls in a can seaming mechanism of this sort with feeler wires. The above described arrangement allows an adjustment of the seaming rolls to be made in this manner with the greatest accuracy and much more precisely than with other arrangements heretofore in use.

Means adjacent the extending ends of the adjusting lever arms 80 for engaging the crosshead 13 and locking the cam followers 62 at an adjusted setting is provided by screws 81 carried in the arms 80 to ride in arcuate slots 82 formed at the ends of the crosshead 13. Below the crosshead 13, the screws 81 are fitted with washers 83 and nuts 84, the washers 83 preferably being flanged as at 85 and 86 to prevent rotation of the washers 83 with respect to the crosshead 13 and to prevent rotation of the nuts 84 with respect to the washers 83 so that the lever arms 80 may be locked or freed on the crosshead 13 merely by manipulating the screws 81. When locked in place by this means, a substantial retaining moment is provided so that the cam followers 62 are easily held secure at an adjusted setting.

The above described arrangement of the can seaming mechanism of the present invention provides a sturdy and serviceable construction which is balanced as pointed out above for smooth operation and to avoid wear, and which may be easily and accurately adjusted for operation. The arrangement of the present invention described above, however, is a preferred embodiment which has been selected for purposes of illustration, and the novel features of this invention may also be employed in can seaming mechanisms generally as defined in the appended claims.

We claim:

1. A can seaming mechanism comprising a frame structure, means for supporting a can body and an associated lid on said frame structure for seaming, means including a drive shaft for rotating said supporting means, a crosshead mounted on said frame structure for transverse rectilinear reciprocation diametrically with respect to said lid and can body, primary and secondary seaming rolls carried on said crosshead at substantially diametrically opposed positions with respect to said lid and can body, said seaming rolls being aligned on said crosshead in the direction of reciprocation of said crosshead, and means actuated by said drive shaft for reciprocating said crosshead, whereby said seaming rolls are applied successively for seaming said lid on said can body with the force of application applied through said crosshead substantially directly in the line of application of said seaming rolls and with the force of application transmitted from said actuating drive shaft in a direction opposite to the direction of the reaction force at said supporting means when said seaming rolls are applied for seaming said lid on said can body, said primary seaming roll being applied by reciprocation of said crosshead in one direction, and reciprocation of said crosshead in the other direction resulting in withdrawal of said primary seaming roll and application of said secondary seaming roll.

2. A can seaming mechanism comprising a frame structure, chuck means on said frame structure for supporting a can body and an associated lid for seaming, means for rotating a can body and lid supported by said chuck means, said rotating means including a drive shaft, a crosshead mounted on said frame structure for transverse rectilinear reciprocation diametrically with respect to said lid and can body, seaming rolls carried on said crosshead at substantially diametrically opposed positions with respect to said lid and can body, said seaming rolls being aligned on said crosshead in the direction of reciprocation of said crosshead, and means actuated by said drive shaft for translating rotation to rectilinear motion for reciprocating said crosshead to apply said seaming rolls successively for seaming said lid on said can body with the force of application applied through said crosshead substantially in the line of application of said seaming rolls and with the force of application transmitted from said actuating drive shaft in a direction opposite to the direction of the reaction force at said chuck means when said seaming rolls are applied for seaming said lid on said can body.

3. In a can seaming mechanism adapted for seaming a lid on a can body, rotatable chuck means for supporting a can body and an associated lid for seaming, means including a drive shaft for rotating said chuck means, rotating cam means actuated from said drive shaft, a crosshead disposed for transverse rectilinear reciprocation diametrically with respect to the lid and can body, seaming rolls carried on said crosshead at substantially diametrically opposite positions with respect to said lid and can body, said seaming rolls being aligned on said crosshead in the direction of reciprocation of said crosshead, and diametrically opposed cam followers mounted on said crosshead in relation to said cam means and in alignment with said seaming rolls whereby said crosshead is reciprocated by said cam means to apply said seaming rolls with the force of application applied through said crosshead substantially directly in the line of application of said seaming rolls and with the force of application transmitted through said cam means from said actuating drive shaft in a direction opposite to the direction of the reaction force at said chuck means when said seaming rolls are applied for seaming said lid on said can body.

4. In a can seaming mechanism adapted for seaming a lid on a can body, the structure defined in claim 33 and further characterized in that said opposed cam followers are eccentrically mounted on said crosshead with respect to their axis of rotation for adjusting the application of said seaming rolls, a lever member is fixed on the eccentric mountings for each of said cam followers for adjusting the setting of said cam followers, and means are provided adjacent the extending ends of said lever members for engaging said crosshead and locking said cam followers at an adjusted setting.

5. A can seaming mechanism comprising a frame structure, rotatable chuck means on said frame structure for supporting a can body and an associated lid for seaming, means including a drive shaft journalled on said frame structure for rotating said chuck means, rotating cam means actuated from said drive shaft, a crosshead mounted on said frame structure for transverse rectilinear reciprocation diametrically with respect to said lid and can body, seaming rolls carried on said crosshead at substantially diametrically opposite positions with respect to said lid and can body, said seaming rolls being aligned on said crosshead in the direction of reciprocation of said crosshead, and diametrically opposed cam followers mounted on said crosshead in relation to said cam means and in alignment with said seaming rolls whereby said crosshead is reciprocated by said cam means to apply said seaming rolls successively for seaming said lid on said can body with the force of application applied through said crosshead substantially directly in the line of application of said seaming rolls and with the force of application transmitted through said cam means from said actuating drive shaft in a direction opposite to the direction of the reaction force at said chuck means when said seaming rolls are applied for seaming said lid on said can body, said cam followers being eccentrically mounted on said crosshead with respect to their axis of rotation for adjusting the application of said seaming rolls.

6. A can seaming mechanism comprising a frame structure, rotatable chuck means disposed on said frame structure for supporting a can body and an associated lid for seaming, a crosshead mounted on said frame structure for transverse rectilinear reciprocation diametrically with respect to said lid and can body, seaming rolls carried on said crosshead at substantially diametrically opposed positions with respect to said lid and can body, said seaming rolls being aligned on said crosshead in the direction of reciprocation of said crosshead, means including a drive shaft journalled on said frame structure for rotating said chuck means, means actuated from said drive shaft for translating rotation to rectilinear motion for reciprocating said crosshead to apply said seaming rolls successively for seaming said lid on said can body with the force of application applied through said crosshead substantially directly in the line of application of said seaming rolls and with the force of application transmitted from said actuating drive shaft in a direction opposite to the direction of the reaction force at said chuck means when said seaming rolls are applied for seaming said lid on said can body, and speed reduction means interposed between said last mentioned means and said drive shaft.

7. A can seaming mechanism as defined in claim 6 and further characterized in that said speed reduction means comprises an eccentric disposed for rotation with said means for rotating said chuck means, an external gear mounted on said eccentric, means preventing rotation of said external gear but allowing displacement of said gear by said eccentric, and a rotatable internal gear engaging said external gear.

8. A can seaming mechanism comprising a frame structure, means on said frame structure for supporting and rotating a can body and associated lid for seaming, a crosshead mounted on said frame structure for transverse rectilinear reciprocation diametrically with respect to said lid and can body, seaming rolls carried on said crosshead at substantially diametrically opposed positions with respect to said lid and can body for application upon reciprocation of said crosshead for seaming said lid on said can body, said seaming rolls being aligned on said crosshead in the direction of reciprocation of said crosshead, rotating cam means associated with said means for supporting and rotating the can body and lid and diametrically opposed cam followers mounted on said crosshead in relation to said cam means and in alignment with said seaming rolls for reciprocating said crosshead, and speed reduction means for actuating said cam means from said means for rotating the can body and lid, said speed reduction means comprising an eccentric disposed for rotation with said means for rotating the can body and lid, an external gear mounted on said eccentric, an extending arm member fixed on said external gear, means on said frame structure engaging said arm member and thereby preventing rotation of said external gear but allowing a sliding rocking movement of said arm member whereby displacement of said external gear by said eccentric is permitted, and a rotatable internal gear engaging said external gear and disposed for driving said cam means.

9. A can seaming mechanism comprising a frame structure, rotatable chuck means disposed on said frame structure for supporting a can body and an associated lid for seaming, means including a drive shaft journalled on said frame structure for rotating said chuck means, rotatable cam means actuated from said drive shaft, a crosshead mounted on said frame structure for transverse rectilinear reciprocation diametrically with respect to said lid and can body, seaming rolls carried on said crosshead at substantially diametrically opposed positions with respect to said lid and can body for application upon reciprocation of said crosshead for seaming said lid on said can body, said seaming rolls being aligned on said crosshead in the direction of reciprocation of said crosshead, diametrically opposed cam followers mounted on said crosshead in relation to said cam means and in alignment with said seaming rolls for reciprocating said crosshead upon rotation of said cam means, and speed reduction means interposed between said cam means and said drive shaft, said speed reduction means comprising an eccentric disposed for rotation with said drive shaft, an external gear mounted on said eccentric, an extending arm member fixed on said external gear, means on said frame structure slidingly engaging the extending end of said arm member and thereby preventing rotation of said external gear but said means allowing a sliding rocking movement of said arm member whereby displacement of said external gear by said eccentric is permitted, and a rotatable internal gear engaging said external gear and disposed for driving said cam means.

OLIVER R. ROWE.
CHARLES S. W. KING.
WILLIAM J. STOLP.

REFERENCES CITED

The following references are of record in the file of this patent:

UNITED STATES PATENTS

| Number | Name | Date |
|---|---|---|
| 1,201,861 | Ochs | Oct. 17, 1916 |
| 1,351,831 | Brenzinger | Sept. 7, 1920 |
| 1,813,220 | Young | July 7, 1931 |
| 1,954,875 | Hopkins | Apr. 17, 1934 |
| 1,975,022 | Scruggs | Sept. 25, 1934 |
| 2,023,598 | Kronquest | Dec. 10, 1935 |
| 2,133,869 | Nelson | Oct. 18, 1938 |
| 2,181,237 | Ives | Nov. 28, 1939 |
| 2,216,082 | Kronquest | Sept. 24, 1940 |
| 2,228,651 | Buck | Jan. 14, 1941 |
| 2,410,263 | Brenzinger | Oct. 29, 1946 |

FOREIGN PATENTS

| Number | Country | Date |
|---|---|---|
| 402,621 | Germany | 1924 |